Feb. 22, 1927. A. H. BONGERS Re. 16,558

APPLIANCE FOR PERMANENT HAIR WAVING

Original Filed April 10, 1923

INVENTOR
ARNOLD H. BONGERS
BY Munn & Co
ATTORNEY

Reissued Feb. 22, 1927. Re. 16,558

UNITED STATES PATENT OFFICE.

ARNOLD HENRY BONGERS, OF LONDON, ENGLAND, ASSIGNOR, BY DIRECT AND MESNE ASSIGNMENTS, TO EDMOND PAUSSER, OF PHILADELPHIA, PENNSYLVANIA, AND RUDOLPH ZABEL, OF DETROIT, MICHIGAN.

APPLIANCE FOR PERMANENT HAIR WAVING.

Original No. 1,510,448, dated September 30, 1924, Serial No. 631,160, filed April 10, 1923. Application for reissue filed September 21, 1926. Serial No. 136,882.

The present invention relates to appliances for use in the hair dressing operation of "permanent waving," in which locks of hair are wound tightly round a rod called a curler and then subjected to heat with or without treatment with a suitable lotion or preparation. Heretofore the hair has been coiled round the curler with the fingers and in some cases mechanical means have been provided on the curler for tightening the coils after they have been wound by hand. Such methods of winding the hair possess the disadvantages that there is considerable strain on the fingers in winding the hair, particularly if no mechanical means are subsequently used for tightening the coils, whilst when mechanical tightening means are employed the tightening effect is not uniform but only a few of the end coils are tightened, with the result that an unsatisfactory wave is produced.

The present invention has for its object to obviate the above described disadvantages, and to increase the speed of winding, and this is accomplished by providing mechanical means for winding the hair on the curler and simultaneously maintaining any desired tension thereof. The invention further includes various features embodied in the construction of mechanical winding means hereinafter described, and set forth in the claims appended hereto, and forming part of this specification.

The invention is illustrated by the accompanying sheet of drawings, wherein:—

Figure 1:
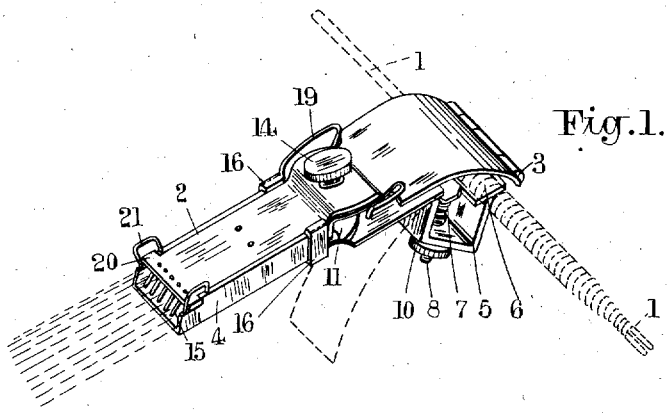
Figure 1 is a perspective view of a preferred construction of winding appliance in use.
Figure 2:
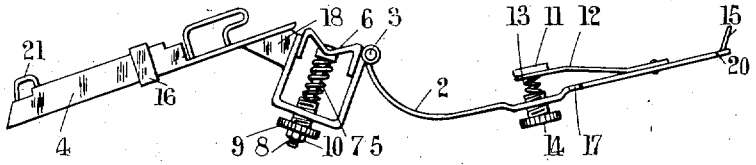
Figure 2 is a side elevation of the appliance opened.
Figure 3:
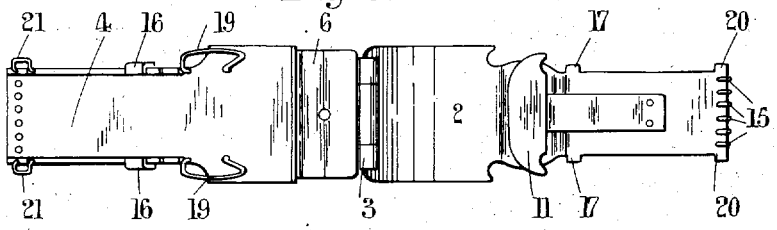
Figure 3 is a plan view of the appliance opened.
Figure 4:
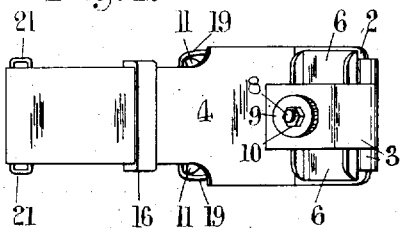
Figure 4 is an underneath plan view of the appliance closed.
Figure 5:
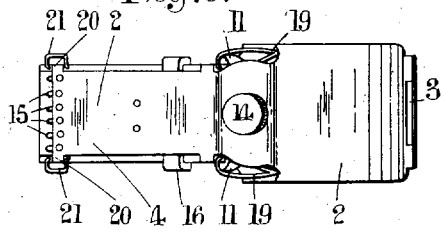
Figure 5 is a top plan view of the appliance closed.

The curler 1 may consist in known manner of a metal rod or tube to which the hair is secured near the root by thread or other fastening means, to facilitate which the end of the curler is preferably bifurcated or slotted. If desired, however, I may employ a curler having mechanical gripping means for the hair at its end.

The curler 1 is clamped within and near the hinge 3 of the winding device which comprises a cover portion 2 hinged at 3 to a lower portion 4, a part of which has side walls forming a channel portion and between which the cover 2 fits. The cover portion 2 is so curved or shaped that the hinge 3 is about level with or below the level of the bottom of the channel of the portion 4. Adjacent the hinge 3 the portion 4 is bent to form a recess 5 and carries therein an upwardly spring pressed platform 6 which is curved or V shaped in cross section. This platform can tilt so that either end can be depressed against the pressure of spring 7, and it is guided by stem 8 passing through the wall of recess 5 and through screw plug 9 adjustable in said wall, said stem being secured by nut 10 bearing on plug 9. Thus the height of the platform 6 can be varied by adjusting nut 10 and the spring pressure can be altered by adjusting plug 9.

On the inner surface of cover portion 2, is a cross piece 11 mounted on a spring finger 12 secured to the cover portion and preferably a coil spring 13, is disposed between the said cross piece 11 and the end of a plug 14 screwed through the cover and adjustable by means of a milled head external to the cover, whereby the pressure of the cross piece 11 against the bottom of the lower portion 4 can be regulated within limits.

Across the end of the cover 2 is arranged a number of pins 15 which engage against, or engage in holes in the end of the portion 4 thus forming a combing device extending across the opening of the appliance. Also slidable along the portion 4 is provided a clip 16 adapted to embrace tongues 17 projecting from the edges of the cover into recesses in the walls of the portion 4 when the cover is closed down, whereby the cover is held in closed position.

In the side wall of the recess 5 remote from the hinge 3 is provided an opening 18 through which lint, tape or like binding material may be introduced into the appliance for the purpose hereinafter explained.

In using the appliance the end of a curler 1 with a strand of hair attached thereto is placed upon platform 6 and the hair laid along the channel portion of the appliance, as indicated in Figure 1. The cover 2 is then shut down and clip 16 slipped along so as to hold it down, the cross piece 11, pressing the hair against the bottom of the appliance and the pins 15 passing through the hair so as to straighten out any tangles before the hair is wound. The appliance is then rotated bodily about the curler 1, which is held stationary, in either a right handed or left handed direction as desired, whereby the hair is coiled round the curler. As the hair winds on the curler one end of platform 6 becomes depressed owing to the increase of thickness so that a pressure longitudinally of the curler is produced, which, as the appliance is rotated, forces it longitudinally of the curler and causes the hair to be wound helically on the curler in the desired manner.

When the hair has been wound nearly to the desired extent a piece of lint, tape or the like is introduced into the appliance through the opening 18, as indicated in Figure 1, so as to enter between platform 6 and the hair on the curler. Continued rotation of the appliance draws the lint in and wraps it tightly round the remaining portion of the hair as it is coiled, whereafter the winding appliance can be slidden along the curler and removed therefrom, the hair being maintained coiled on the curler 1 for subsequent treatment, by string, or the like, tied on over the lint or tape wrapping.

Adjustment of the spring pressure on the cross piece 11 varies the pull on the hair and therefore the tension of the winding. The height of the platform 6 is adjustable to suit different sizes of curlers or thicknesses of hair to be wound.

In order to prevent the hair from working past the ends of cross piece 11, the latter extends across the side walls of the channel portion 4, but the walls are, in effect, continued by the legs of wire bridge pieces 19 passing over the cross piece 11, and having their looped upper portions bent outwardly. Further, in order to prevent hair from working out between the edges of the cover 2, and the walls of the channel portion the edges of the cover 2 have tongues 20 at its free end which extend across the cracks between the edges of the cover 2 and the side walls and fit into recesses in the edges of the side walls. Further, on the edges of the side walls wire members 21 are arranged bridging the said tongues 20 and having their looped upper portions bent outwardly to guide the hair into the channel portion and clear of said recesses.

It should be understood that the invention is not limited to the embodiment thereof hereinbefore described and illustrated by way of example, as other constructions can obviously be devised within the scope of the appended claims.

What I claim is:—

1. An appliance for winding hair on curlers, comprising a guide for hair; and a part cooperative with the curler and adapting the appliance for pivotal movement with respect to the curler, whereby the said guide is made to travel in a path around the curler.

2. An appliance for winding hair on curlers, comprising a guide for hair; and a curler-receiving socket adapting the appliance for pivotal movement about the curler.

3. An appliance for winding hair on curlers, comprising a guide for hair adapted to be moved in a path around the curler; and curler-engaging means adapted to maintain a predetermined operative relation between the said guide and the curler.

4. An appliance for winding hair on curlers, comprising a guide for hair adapted to be moved in a path around the curler; curler-engaging means adapted to maintain a predetermined operative relation between the said guide and the curler; and means for tensioning the hair passing through the guide.

5. An appliance for winding hair on curlers, comprising means for confining a strand of hair; tensioning means tending to retard the passage of said strand through the said confining means; and a part cooperative with the curler and adapting the appliance for pivotal movement with respect to the curler, whereby the confining means is made to move in a path around the curler.

6. An appliance for winding hair on curlers, comprising a hair receiving channel adapted to be moved in a path around the curler; means for confining the hair to the channel; and curler-engaging means adapted to maintain a predetermined operative relation between the said channel and the curler.

7. An appliance for winding hair on curlers, comprising a hair receiving channel adapted to be moved in a path around the curler; means for confining the hair to the channel; curler-engaging means adapted to maintain a predetermined operative relation between the said channel and the curler; and pressure means tending to retard the passage of the hair through the channel.

8. An appliance for winding hair on curlers, comprising a hair receiving channel adapted to be moved in a path around the curler; means for confining the hair to the channel; curler-engaging means adapted to maintain a predetermined operative relation between the said channel and the curler; pressure means tending to retard the passage of the hair through the channel; and means for adjusting the pressure of said retarding means.

9. An appliance for winding hair on curlers, comprising a guide for hair adapted to be moved in a path around the curler; curler-engaging means adapted to maintain a predetermined operative relation between the said guide and the curler; and adjustable means for tensioning the hair between the guide and the curler.

10. An appliance for winding hair on curlers, comprising a guide for hair adapted to be moved in a path around the curler; and curler-engaging means whereby a predetermined operative relation between the guide and the curler may be maintained.

11. An appliance for winding hair on curlers, comprising a guide for hair adapted to be moved in a path around the curler; and means for clamping the guide on the curler while permitting the said movement of the guide around the curler.

12. An appliance for winding hair on curlers, comprising a guide for hair; and means for supporting the guide on the curler to permit movement of the guide therearound.

13. An appliance for winding hair on curlers, comprising a guide for hair; and means for supporting the guide on the curler to permit movement of the guide both around and longitudinally of the curler.

14. An appliance for winding hair on curlers, comprising a guide for hair; and resilient means for supporting the guide on the curler to permit movement of the guide therearound.

15. An appliance for winding hair on curlers, comprising a guide for hair movable pivotally about the curlers as an axis; and a clamp adjustable radially of said axis for attaching the guide to the curler.

16. An appliance for winding hair on curlers, comprising a guide for hair movable pivotally about the curler as an axis; a clamp including opposed gripping elements for the curler whereby the said guide is attached to the curler; and resilient means tending to bring said elements together.

17. An appliance for winding hair on curlers, comprising a guide for hair movable pivotally about the curler as an axis; and an expandable clamp for attaching the guide to the curler.

18. An appliance for winding hair on curlers, comprising a guide for hair movable pivotally about the curler as an axis; and means for supporting the guide on the curler so that it extends angularly from the latter.

19. An appliance for winding hair on curlers comprising a member having angularly disposed channels; means for confining a strand of hair in one of said channels; and means for confining the curler in the other of said chamber.

20. An appliance for winding hair on curlers comprising a member having angularly disposed and communicating channels; means for confining a strand of hair in one of said channels; and means for confining the curler in the other of said channels.

21. An appliance for winding hair on curlers comprising a member having angularly disposed channels; means for confining a strand of hair in one of said channels; means for confining the curler in the other of said channels; and means in the last-named channel for resiliently gripping the curler.

22. An appliance for winding hair on curlers comprising a member having angularly disposed channels; means for confining a strand of hair in one of said channels; means for confining the curler in the other of said channels; a pressure shoe in the last-named channel; and resilient means for forcing the shoe against the curler.

23. An appliance for winding hair on curlers comprising a member including a guide for hair and having a channel for reception of the curler; a shoe in said channel; and resilient means for forcing the shoe against the curler.

24. An appliance for winding hair on curlers comprising a member including a guide for hair and a clamp for the curler, said clamp including a member resiliently opposed to the curler and self-adjustable longitudinally of the latter.

25. An appliance of the kind set forth, comprising a hinged two part clamp device; a passage therethrough for a curler; a second passage thereinto for hair communicating with the first passage, said passages being both rendered accessible by opening of the parts of the clamp to permit a strand of hair attached to a curler being positioned therein; and means in the curler passage for resiliently gripping the curler.

26. An appliance as set forth in claim 25, wherein the curler passage has mounted therein means rendered operative by a coil of hair wound on the curler to cause longitudinal pressure on the curler which causes automatic feeding of the clamp device longitudinally of the curler as the clamp device is rotated thereabout.

27. An appliance as set forth in claim 25, wherein the curler passage contains a resiliently mounted platform upon which the curler rests, said platform being tiltable longitudinally of said passage.

28. An appliance as set forth in claim 25, including a spring arm in the hair passage having a portion extending transversely of said passage, said arm being attached to one of the parts of the clamp device at one end, and having its other end bearing against the other part of the clamp.

29. An appliance as set forth in claim 25, including a member extending transversely within the hair passage; and spring means bearing against one of said clamp parts and pressing said member towards the other of said clamp parts.

30. An appliance as set forth in claim 25, including a cross bar extending transversely within the hair passage; a spring arm connected to said cross bar and to one of the parts of the clamp device; a coil spring bearing between the first mentioned clamp part and said cross bar; and means for adjusting the pressure of said spring.

31. An appliance as set forth in claim 25, including combing elements disposed in a line transversely across the hair passage and mounted on one of said clamp parts.

32. An appliance as set forth in claim 25, wherein the clamp device comprises a pair of hinged members, one having a channel portion and the other having a cover portion for said channel portion; and adjustable means for holding the two members together with the cover portion covering the channel portion.

33. An appliance as set forth in claim 25, wherein the clamp device comprises a pair of hinged members, one having a channel portion and the other having a cover portion for said channel portion; and adjustable means for holding the two members together with the cover portion covering the channel portion, and wherein one hinged member has a recessed portion adjacent the hinge and accommodating the tiltable platform in parallel relation to the hinge.

34. An appliance as set forth in claim 25, wherein an aperture is provided in one of said clamp parts opening into the curler passage thereof at the junction therewith of the hair passage, said aperture serving to guide a length of lint into the clamp device for coiling round the curler with hair coiled thereon.

35. An appliance as set forth in claim 25, wherein the clamp device comprises a pair of hinged members, one having a channel portion and the other having a cover portion for said channel portion; and adjustable means for holding the two members together with the cover portion covering the channel portion, and wherein tongues are provided on the edges of said cover portion and corresponding recesses in the edges of the walls of said channel portion.

36. An appliance as set forth in claim 25, wherein the clamp device comprises a pair of hinged members, one having a channel portion and the other having a cover portion for said channel portion; and adjustable means for holding the two members together with the cover portion covering the channel portion, and wherein tongues are provided on the edges of said cover portion and corresponding recesses in the edges of the walls of said channel portion, and wherein said recesses are bridged by guard members consisting of wire bent to an inverted U shape.

37. An appliance as set forth in claim 25, wherein the clamp device comprises a pair of hinged members, one having a channel portion and the other having a cover portion for said channel portion; and adjustable means for holding the two members together with the cover portion covering the channel portion, and wherein the legs of inverted U shaped metal guide members outwardly bent at their looped ends form continuations of the side walls of the channel portion.

38. An appliance of the kind set forth, comprising a pair of hinged members; a recessed portion transversely of one of said members adjacent the hinge; a resiliently mounted platform in said recessed portion tiltable laterally of the member; a channel portion in said member adjacent said recessed portion; a portion of the other hinged member adjacent the hinge adapted to cooperate with the tiltable platform to grip a curler placed therebetween transversely of the hinged members; a portion of said other hinged member forming a cover for said channel portion; means for securing said hinged members in their relative closed positions; and a passage for hair longitudinally between said hinged members and leading to the surface of said platform.

39. An appliance of the kind set forth, comprising a pair of hinged members; a recessed portion transversely of one of said members adjacent the hinge; a resiliently mounted platform in said recessed portion tiltable laterally of the member; a channel portion in said member adjacent said recessed portion; resiliently actuated means pressing against the bottom of said channel portion; a portion of the other hinged member adjacent the hinge adapted to cooperate with the tiltable platform to grip a curler placed therebetween transversely of the hinged members; a portion of said other hinged member forming a cover for said channel portion; means for securing said hinged members in their relative closed positions; and a passage for hair longitudinally between said hinged members and leading to the surface of said platform.

40. An appliance of the kind set forth, comprising a pair of hinged members; a recessed portion transversely of one of said members adjacent the hinge; a resiliently mounted platform in said recessed portion tiltable laterally of the member; a channel portion in said member adjacent said recessed portion; an aperture in one wall of said recessed portion opening level with the surface of said platform; a portion of the other hinged member adjacent the hinge adapted to cooperate with the tiltable platform to grip a curler placed therebetween transversely of the hinged members; a portion of said other hinged member forming a cover for said channel portion; means for securing said hinged members in their relative closed positions; and a passage for hair longitudinally between said hinged members and leading to the surface of said platform.

ARNOLD HENRY BONGERS.